United States Patent [19]

Langner

[11] Patent Number: 4,615,645
[45] Date of Patent: Oct. 7, 1986

[54] PIPELINE TRENCHING

[75] Inventor: Carl G. Langner, Spring, Tex.

[73] Assignee: Shell Oil Company, Houston, Tex.

[21] Appl. No.: 730,535

[22] Filed: May 6, 1985

[51] Int. Cl.[4] .............................................. F16L 1/04
[52] U.S. Cl. ..................................... 405/159; 114/42;
37/67; 299/81; 405/166
[58] Field of Search ............... 405/158, 159, 163, 166,
405/168; 114/42; 37/67; 299/81; 175/339, 340

[56] References Cited

U.S. PATENT DOCUMENTS

| | | | |
|---|---|---|---|
| 1,220,187 | 3/1917 | Chapman | 405/166 |
| 3,335,686 | 8/1967 | Pontbriand et al. | 114/42 |
| 3,600,898 | 8/1971 | Godfrey et al. | 405/158 |
| 3,847,439 | 11/1974 | Allen | 299/81 |
| 3,950,955 | 4/1976 | Meeres | 61/72.3 |
| 4,043,135 | 8/1977 | Hoes et al. | 61/72.5 |
| 4,091,629 | 5/1978 | Gunn et al. | 61/72.4 |
| 4,129,992 | 12/1978 | Carlsson et al. | 405/168 |
| 4,252,465 | 2/1981 | Broussard et al. | 405/158 |
| 4,409,747 | 10/1983 | Kaldenbach | 37/69 |
| 4,516,642 | 5/1985 | Childers et al. | 175/340 |
| 4,521,132 | 6/1985 | Isakson | 405/166 |

FOREIGN PATENT DOCUMENTS

| | | | |
|---|---|---|---|
| 697090 | 11/1964 | Canada | 405/166 |
| 981115 | 1/1976 | Canada | 405/217 |
| 1120538 | 7/1968 | United Kingdom | 37/67 |

Primary Examiner—Cornelius J. Husar
Assistant Examiner—Kristina I. Hall

[57] ABSTRACT

A hollow curved auger is provided for simultaneously laying and trenching a pipeline, as from the surface of an ice-covered body of water. The pipeline passes through the auger which comprises rotary teeth encircling the pipeline and turning in opposed directions. The depth and direction of pipeline trenching and burial are controlled by varying the longitudinal force in the pipe and rotational orientation of the auger.

12 Claims, 2 Drawing Figures

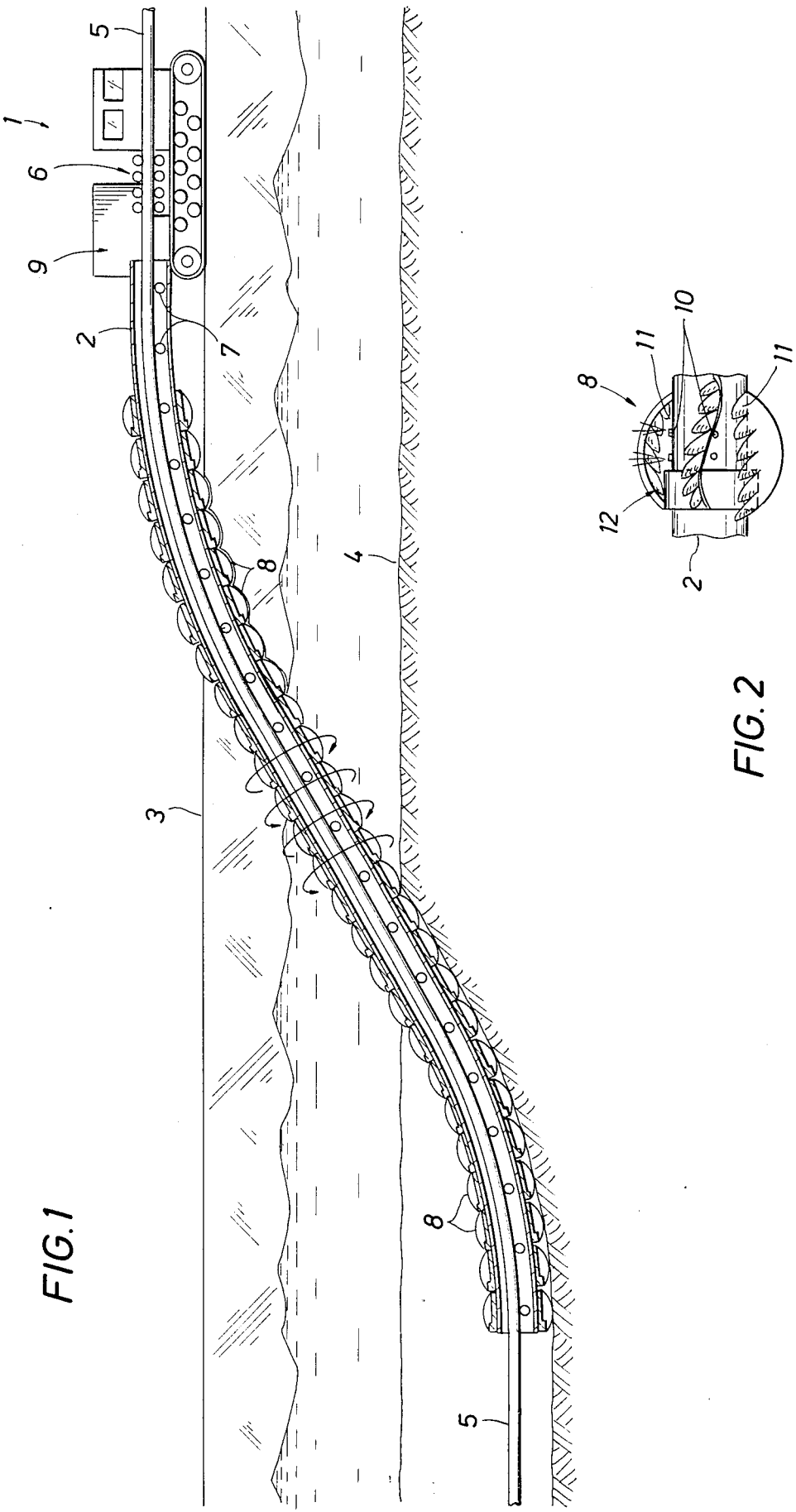

PIPELINE TRENCHING

BACKGROUND OF THE INVENTION

Drilling by the oil industry in Arctic offshore waters, typically from artificial gravel islands constructed to support such drilling activities, creates a need for pipelines from such drilling sites to transport oil and gas to production facilities onshore. Conventional pipeline construction techniques are extremely difficult to implement in the Arctic offshore waters, due to the limited ice-free summer work period in Arctic waters. Therefore, it is desirable to lay offshore pipelines during the winter time, using conventional "through the ice" pipelaying techniques. Accordingly, pipelaying in the Arctic region during the winter necessitates cutting a long vertical slot in the ice sheet so that the pipeline may be laid through the ice slot and down to the seabottom. In addition, a trench must be excavated in the seabottom to accommodate and protect the pipeline from gouging and scouring effects of moving ice keels, etc. For ordinary trench excavation techniques, the trench tends to fill in, especially in a sandy soil, and typically five to ten times as much soil must be excavated as in a vertical sidewall ditch. After the trench is dug, yet another operation is required to construct and lower the pipeline into the trench, meanwhile keeping the ice slot open and keeping the trench from filling in. All of these operations require considerable coordination, and failure in any one operation substantially increases construction time and cost.

Applicant is not aware of any prior art reference which, in his opinion as one skilled in the pipeline art, would anticipate or render obvious the novel method and apparatus of the present invention; however, for the purposes of fully developing the background of the invention and establishing the state of the requisite art, the following patents are set forth: U.S. Pat. Nos. 3,950,955; 4,091,629; 4,409,747; 4,043,135.

SUMMARY OF THE INVENTION

The primary purpose of the present invention is to provide a method and apparatus for pipelaying in Arctic offshore waters, which method and apparatus are economical in use and saving of construction time, and which overcome many of the above noted deficiencies of the prior art. Accordingly, the present invention provides a method for laying a pipeline into a seabed, comprising: towing a tubular pipe guide; continuously burying one end of the pipe guide in a seabed; and passing the pipeline through the pipe guide and into the seabed. Preferably, said one end of said tubular pipe guide is buried in the seabed by rotating circular cutters about the pipe guide and cutting the seabed from beneath the pipe guide. More preferably, jets are employed within the cutters to remove seabed material which is entrained between the pipe guide and the cutters. Also, preferably, the tension or compression force in the pipe is controlled from the surface in order to control the depth and rate of cut. Also, more preferably, the rotational orientation of the tubular pipe guide is controlled from the surface in order to control the direction of the cut.

The present invention also provides an apparatus for laying a pipeline into a seabed, comprising: a tubular pipe guide; means for towing the tubular pipe guide; means for continuously burying one end of the pipe guide in the seabed; and means for passing the pipeline through the pipe guide and into the seabed. Preferably, the apparatus includes rotatable circular cutters encircling the pipe guide which are functional to cut the seabed from beneath the pipe guide. Even more preferably, jets are located within the cutters and are functionable to remove seabed material entrained between the pipe guide and the cutters. Also, preferably, means are provided to control the tension or compression force in the pipe, and to control the rotational orientation of the tubular pipe guide, from the surface, which in turn control the depth and rate of cut, and the direction of the cut, respectively.

Other purposes, distinctions over the art, advantages and features of the invention will be apparent to one skilled in the art from the following disclosure.

BRIEF DESCRIPTION OF THE DRAWING

FIG. 1 provides a sectional elevational view showing the ice cutting and trench excavating techniques of the present invention.

FIG. 2 provides a view of the circular cutters employed with the present invention.

DESCRIPTION OF PREFERRED EMBODIMENTS

The present invention pertains to an apparatus and method for the simultaneous cutting of an ice slot, trenching and installation of a submarine pipeline. The apparatus includes, in a single unit, a traveling cutter for simultaneously cutting a slot in an ice sheet, for excavating a trench in the seabed beneath the ice sheet and for laying a pipeline into the trench. Thus, the present invention provides a special construction machine with an S-shaped tubular pipe guide with cutters encircling the tubular pipe guide to cut a slot in both the ice sheet and the seabed and to lay a pipestring through the S-shaped tubular pipe guide and into the trench cut into the seabed. The free end of the tubular pipe guide is connected to a machine on the surface of the ice which tows the tubular pipe guide and which provides power to the circular cutters encircling the tubular pipe guide. The machine on the surface also provides the means of controlling the tension or compression force in the pipe and the rotational orientation of the tubular pipe guide, as necessary to control the depth, rate, and direction of the cut.

As shown in FIG. 1, construction machine 1 which is preferably a tracked vehicle, has an attached tubular pipe guide 2 which preferably has an S-shape and which is functional to cut a slot through a floating ice sheet 3 and into a seabed 4 underlying the ice sheet. Simultaneously with cutting the ice sheet and cutting a trench into the seabed, a pipeline 5 is passed through tensioning means 6 of a known variety on the construction machine 1 and into the tubular pipe guide 2 and over rollers 7 within the pipe guide, or other friction reducing means as are well known in the art. The pipe tensioner 6 controls the tension or compression in the pipe 5 as it leaves the S-shaped tubular pipe guide at the bottom of the trench. This pipe tension or compression in turn controls the pressure between the soil and the cutters described hereinafter, and hence determines the depth and rate of cut.

As above mentioned, encircling the S-shaped trencher 2 are a series of cutters 8, preferably of similar shape and more particularly shown in FIG. 2, which are mounted on the exterior of the trencher, which is preferably tubular, and which are powered by hydraulic pumps 9 on the surface vehicle and hydraulic motors 12 connecting the cutters to the tubular pipe guide 2, in order to cut and remove soil around the S-tube trencher and pipe 5. Means for carrying hydraulic fluid to the cutters and details of hydraulic motors for rotating the cutters are not shown but are well known in the art. Adjacent cutters preferably are rotated in opposite directions in order to minimize net forces and torques on the trencher developed by the cutting action between the cutters and the ice or soil. Jets 10 within the blades 11 of the cutters keep the cutter blades clean, thus allowing the operation to proceed continuously.

Means are also provided for controlling the rotational orientation of the S-shaped pipe guide, which in turn controls the direction of the cutting action. Such orientation of the pipe guide may be controlled either by applying a torque to the guide at the connection to the surface machine, or by controlling the differential speed of the cutters that are rotating in opposite directions, or by a combination of these means.

The foregoing description of the invention is merely intended to be explanatory hereof and various changes in the details of the described method and apparatus may be made within the scope of the appended claims without departing from the spirit of the invention.

What is claimed is:

1. A method for laying a pipeline simultaneously through ice above a seabed and into the seabed, comprising:
    towing a tubular pipe guide from above the ice;
    rotating circular cutters about the pipe guide and simultaneously cutting the ice and the seabed from beneath the pipe guide;
    continously burying one end of the pipe guide through the ice and into the seabed; and
    passing the pipeline through the pipe guide and into the seabed.

2. The method of claim 1 wherein jets are employed within the cutters to remove seabed which is entrained between the pipe guide and the cutters.

3. The method of claim 1 wherein the orientation of the pipe guide is controlled, thereby controlling the direction of the pipeline in the seabed.

4. The method of claim 1 wherein said circular cutters comprise a series of discrete cutters which are rotated in opposite directions to minimize the net force and torque on the pipe guide.

5. The method of claim 2 wherein said tubular pipe guide is towed by means above the seabed which provides power for hydraulic motors to operate the cutters and jets.

6. An apparatus for laying a pipeline simultaneously through ice above a seabed and into the seabed, comprising:
    a tubular pipe guide;
    means above the ice for towing the tubular pipe guide;
    means for rotating circular cutters about the pipe guide and simultaneously cutting the ice and the seabed from beneath the pipe guide;
    means for continuously burying one end of the pipe guide through the ice and into the seabed; and
    means for passing the pipeline through the pipe guide and into the seabed.

7. The apparatus of claim 6 including jets located within the cutters and functionable to remove seabed entrained between the pipe guide and the cutters.

8. The apparatus of claim 6 including means for maintaining tension on the pipeline.

9. The apparatus of claim 6 including means for controlling the orientation of the pipe guide.

10. The apparatus of claim 6 wherein the tubular pipe guide is S-shaped.

11. The apparatus of claim 10 wherein pipe rollers are located within the tubular pipe guide.

12. The apparatus of claim 6 wherein the cutters are a series of discrete cutters which are counter-rotatable.

* * * * *